United States Patent
Kim et al.

(10) Patent No.: US 11,527,787 B2
(45) Date of Patent: Dec. 13, 2022

(54) SEPARATOR HAVING MELTING-CUTOFF PORTION AND ELECTROCHEMICAL DEVICE INCLUDING THE SAME

(71) Applicant: LG CHEM, LTD., Seoul (KR)

(72) Inventors: Jeong Gil Kim, Daejeon (KR); Jung Seok Choi, Daejeon (KR); Song Taek Oh, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 237 days.

(21) Appl. No.: 16/652,710

(22) PCT Filed: Oct. 25, 2018

(86) PCT No.: PCT/KR2018/012759
§ 371 (c)(1),
(2) Date: Apr. 1, 2020

(87) PCT Pub. No.: WO2019/083307
PCT Pub. Date: May 2, 2019

(65) Prior Publication Data
US 2020/0295414 A1 Sep. 17, 2020

(30) Foreign Application Priority Data
Oct. 26, 2017 (KR) .................. 10-2017-0140348

(51) Int. Cl.
*H01M 10/48* (2006.01)
*H01M 10/052* (2010.01)
(Continued)

(52) U.S. Cl.
CPC ........... *H01M 10/486* (2013.01); *H01M 4/13* (2013.01); *H01M 10/052* (2013.01);
(Continued)

(58) Field of Classification Search
CPC ..... H01M 50/431; H01M 50/40; H01M 50/20
See application file for complete search history.

(56) References Cited

U.S. PATENT DOCUMENTS 7,087,343 B2 * 8/2006 Shi .................... H01M 10/0525
429/62
7,662,517 B2 2/2010 Lee et al.
(Continued)

FOREIGN PATENT DOCUMENTS

| CN | 104584269 A | 4/2015 |
|---|---|---|
| CN | 105190941 A | 12/2015 |

(Continued)

OTHER PUBLICATIONS

Extended European Search Report issued by the European Patent Office dated Jul. 16, 2020 in corresponding European patent application No. 18871737.5.
(Continued)

*Primary Examiner* — Kenneth J Douyette
(74) *Attorney, Agent, or Firm* — Morgan, Lewis & Bockius LLP

(57) ABSTRACT

Disclosed herein are a secondary battery configured to be prevented from catching fire or exploding in a critical situation such as overcharging and a method of preventing the secondary battery from catching fire or exploding. Since a separator including a low melting point material is used, a short circuit in the battery occurs when the battery is abnormally heated, and the resistance of an electrode is increased when the temperature of the battery increases to a predetermined temperature or higher. As a result, a positive temperature coefficient (PTC) material is operated at a stable State of Charge (SoC). Consequently, it is possible to prevent the occurrence of a thermal runaway phenomenon of the battery.

15 Claims, 5 Drawing Sheets

(51) Int. Cl.
*H01M 4/13* (2010.01)
*H01M 50/20* (2021.01)
*H01M 50/431* (2021.01)
*H01M 4/02* (2006.01)

(52) U.S. Cl.
CPC ......... *H01M 50/20* (2021.01); *H01M 50/431* (2021.01); *H01M 2004/027* (2013.01); *H01M 2004/028* (2013.01); *H01M 2200/106* (2013.01)

(56) References Cited

U.S. PATENT DOCUMENTS

| | | |
|---|---|---|
| 9,601,740 B2 | 3/2017 | Lee et al. |
| 2009/0111025 A1 | 4/2009 | Lee et al. |
| 2015/0162588 A1 | 6/2015 | Lee et al. |
| 2016/0240836 A1* | 8/2016 | Aotani ............... H01M 50/581 |
| 2016/0285064 A1 | 9/2016 | Hatta et al. |
| 2017/0162855 A1 | 6/2017 | Kim et al. |
| 2017/0309970 A1 | 10/2017 | Kim et al. |
| 2018/0205115 A1 | 7/2018 | Haba et al. |
| 2019/0386287 A1 | 12/2019 | Kim et al. |
| 2021/0167393 A1 | 6/2021 | Kuzuoka et al. |

FOREIGN PATENT DOCUMENTS

| | | |
|---|---|---|
| CN | 106960933 A | 7/2017 |
| JP | 2011-192784 A | 9/2011 |
| JP | 2011-210390 A | 10/2011 |
| JP | 2013-191391 A | 9/2013 |
| JP | 2014-179279 A | 9/2014 |
| JP | 2017-510960 A | 4/2017 |
| KR | 10-2007-0074961 A | 7/2007 |
| KR | 10-0775310 B1 | 11/2007 |
| KR | 10-2012-0081385 A | 7/2012 |
| KR | 10-2014-0130647 A | 11/2014 |
| KR | 10-2015-0131025 A | 11/2015 |
| KR | 10-2016-0073298 A | 6/2016 |
| KR | 10-2016-0119509 A | 10/2016 |
| KR | 10-2016-0121998 A | 10/2016 |
| KR | 10-1709569 B1 | 2/2017 |
| KR | 10-2017-0064702 A | 6/2017 |
| WO | 2017/014245 A1 | 1/2017 |
| WO | 2017/126510 A1 | 7/2017 |

OTHER PUBLICATIONS

International Search Report (with partial translation) and Written Opinion dated Jan. 23, 2019, issued in corresponding International Patent Application No. PCT/KR2018/012759.

* cited by examiner

[FIG. 1]
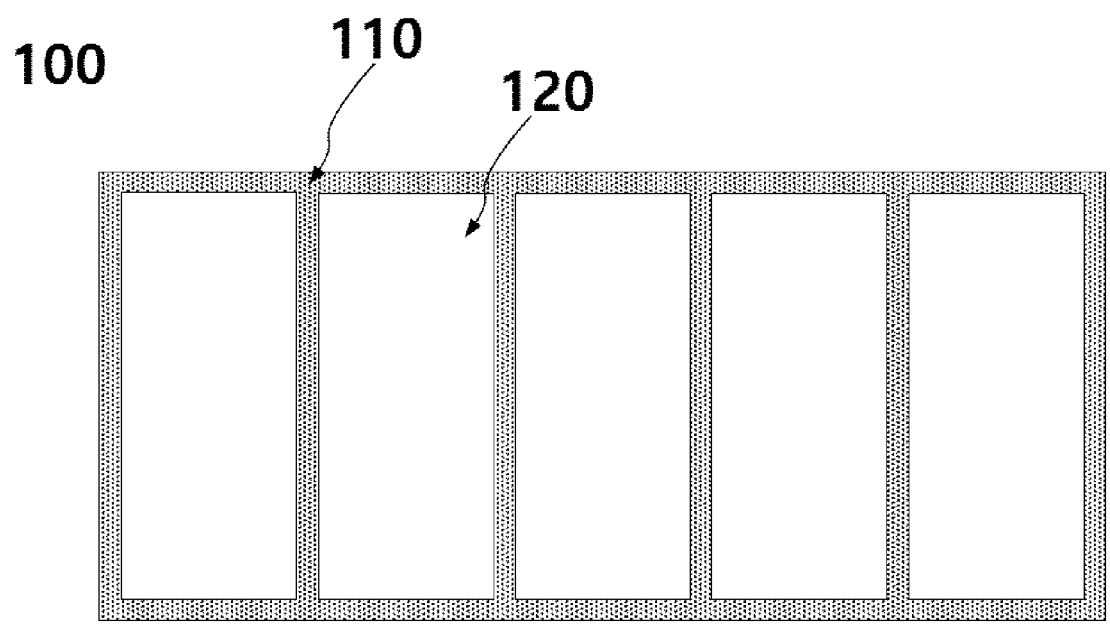

[FIG. 2]
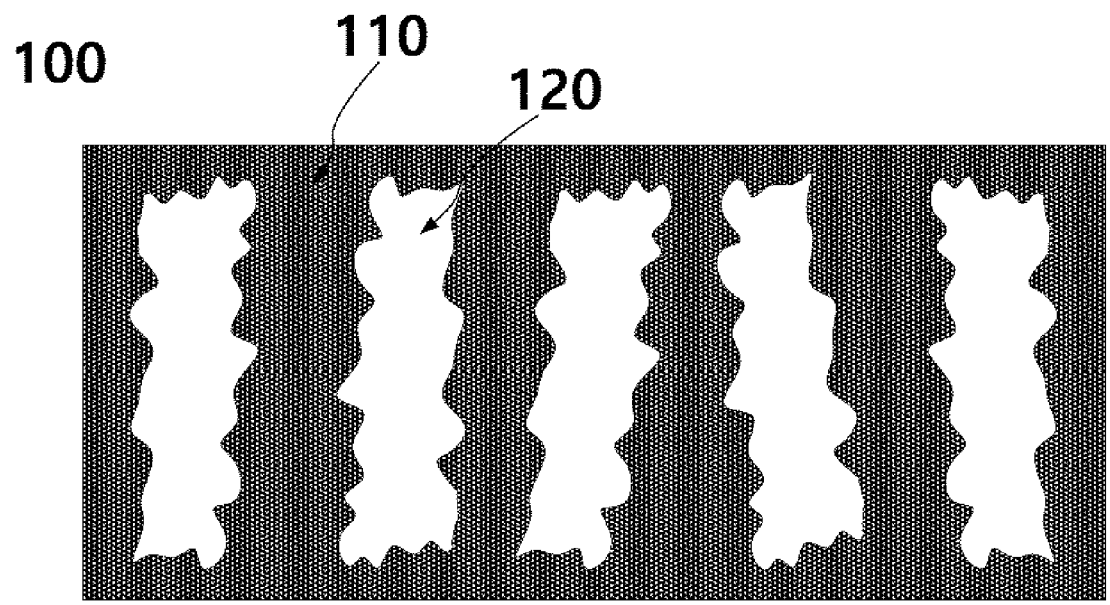

[FIG. 3]
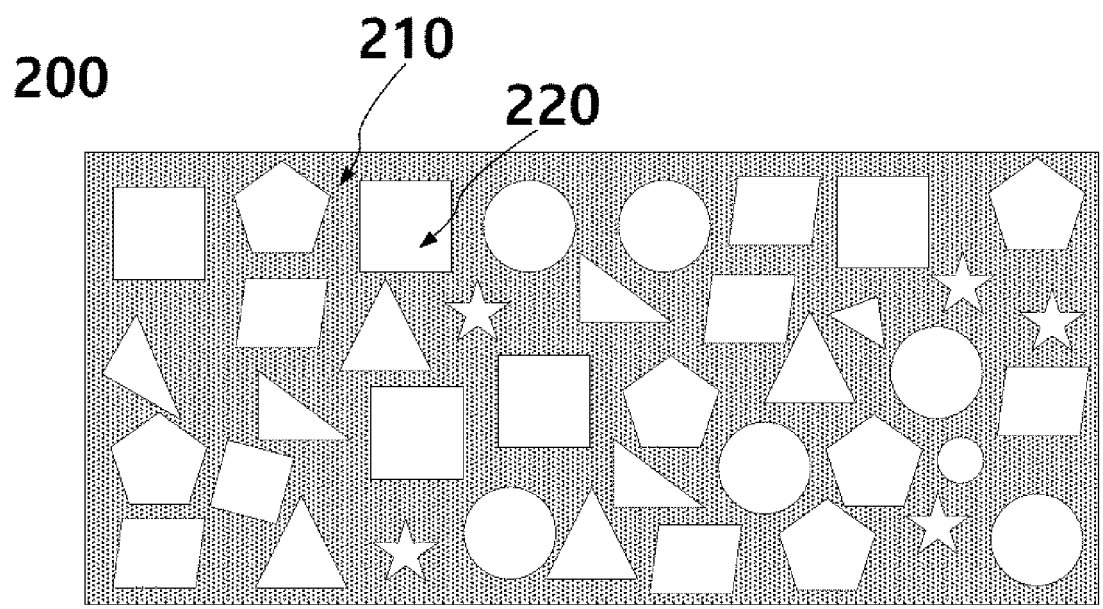

[FIG. 4]
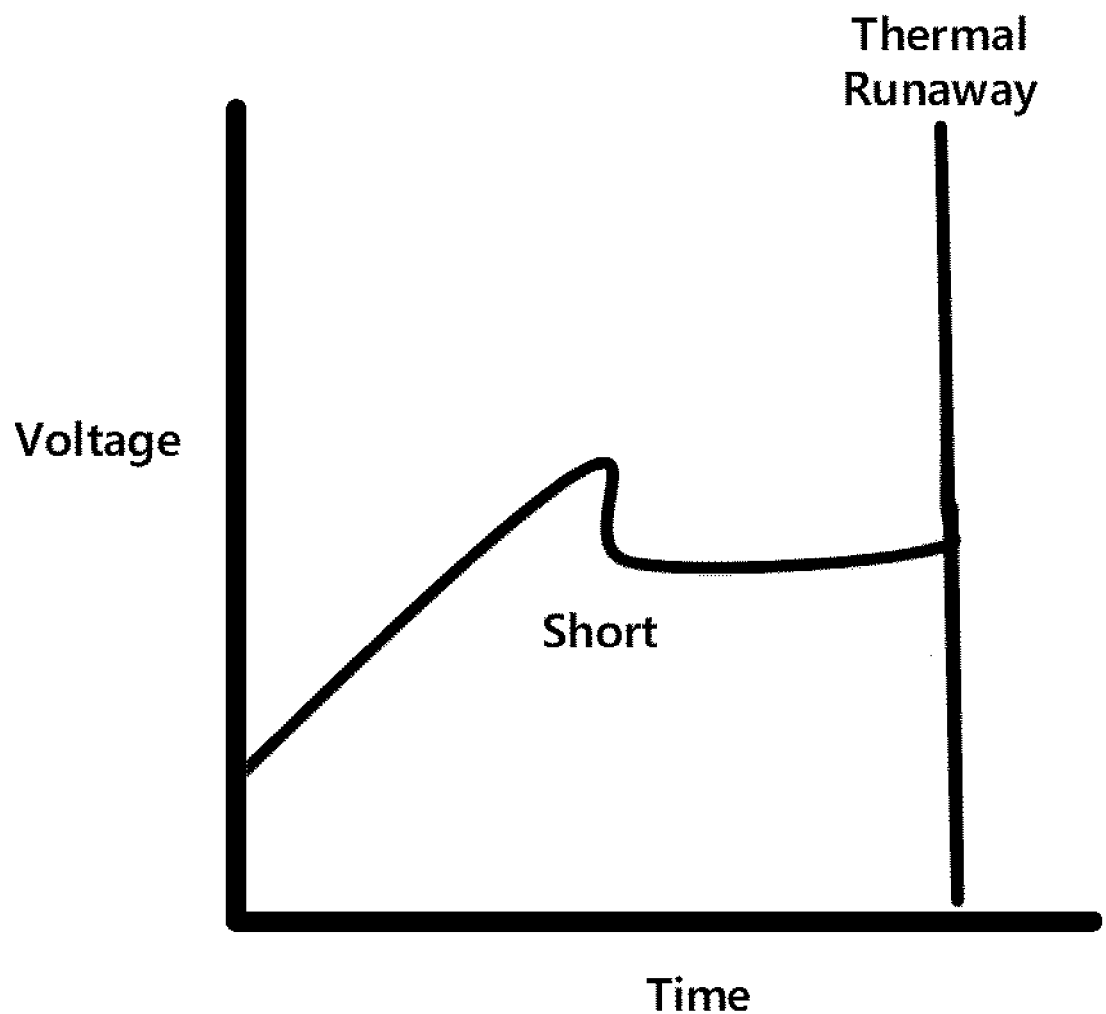

[FIG. 5]
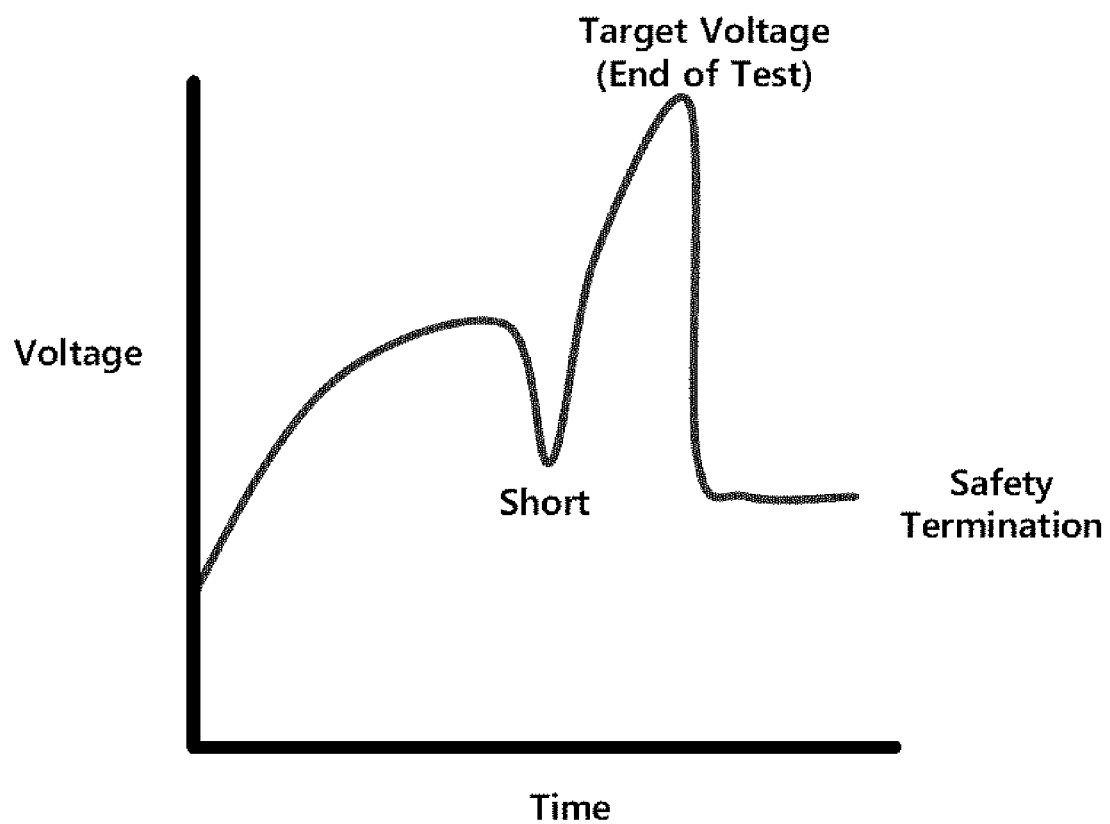

SEPARATOR HAVING MELTING-CUTOFF PORTION AND ELECTROCHEMICAL DEVICE INCLUDING THE SAME

TECHNICAL FIELD

This application claims the benefit of Korean Patent Application No. 2017-0140348 filed on Oct. 26, 2017 with the Korean Intellectual Property Office, the disclosure of which is herein incorporated by reference in its entirety.

The present invention relates to a separator having a melting-cutoff portion and an electrochemical device including the same, and more particularly to a separator including a melting portion having a low melting point material and shrinkage portions configured to shrink at a high temperature, and an electrochemical device including the same.

BACKGROUND ART

As the demand for mobile devices has increased, the demand for secondary batteries as energy sources for mobile devices has also sharply increased. Batteries may be classified into a cylindrical battery, a prismatic battery, and a pouch-shaped battery based on the shape of a battery case. Each of the cylindrical battery and the prismatic battery is a battery that is configured to have a structure in which an electrode assembly is mounted in a metal can. The pouch-shaped battery is a battery that is generally configured to have a structure in which an electrode assembly is mounted in a pouch-shaped battery case made of an aluminum laminate sheet. Among these batteries, the pouch-shaped battery, which can be stacked with high integration, has high energy density per unit weight, is inexpensive, and can be easily modified, has attracted considerable attention.

A continuous goal for mobile devices is to increase the capacity of an individual mobile device while decreasing the size of the mobile device. In the case in which much more energy is aggregated densely in a mobile device having a reduced volume, the safety of the mobile device becomes an issue. In particular, the safety of a secondary battery used in the mobile device must be guaranteed in the first place, since the mobile device is very close to the user who uses the mobile device.

A lithium secondary battery may explode due to various causes, such as a short circuit in the secondary battery, overcharge of the secondary battery with higher than an allowed current or voltage, exposure of the secondary battery to high temperatures, or deformation of the secondary battery due to being dropped or having an external impact applied thereto. Various attempts to guarantee the safety of the lithium secondary battery have been made. A mechanical device that physically induces a short circuit in the secondary battery using the temperature or the pressure in the secondary battery has been primarily used.

For example, Patent Document 1 discloses a battery having a connection releasing means for releasing an electrical connection between an electrode terminal formed at a battery case and a lead for connecting the terminal to a power storage element and a pushing means for pushing a cutting means toward the lead when the temperature in a hollow part of the battery case in which the connection releasing means is received is a predetermined temperature or higher.

Various technologies for preventing a short circuit in the secondary battery through the improvement of materials have been proposed. In the case in which a sharp needle-shaped conductor having high electrical conductivity, such as a nail, penetrates the electrode assembly, the positive electrode and the negative electrode of the electrode assembly are electrically connected to each other via the needle-shaped conductor, with the result that electric current flows through the needle-shaped conductor, the resistance of which is low. At this time, the electrodes through which the needle-shaped conductor has penetrated are deformed, and high resistance heat is generated due to conducting current in a contact resistance portion between a positive electrode active material and a negative electrode active material. In the case in which the temperature in the electrode assembly exceeds a critical temperature level due to the resistance heat, the positive electrode and the negative electrode come into contact with each other due to shrinkage of the separator, with the result that a short circuit occurs. Such a short circuit causes a thermal runaway phenomenon. As a result, the electrode assembly and a secondary battery including the electrode assembly may catch fire or explode.

In addition, in the case in which the electrode active material or the current collector bent by the needle-shaped conductor contacts an opposite electrode facing the electrode active material or the current collector, heat higher than the resistance heat is generated, whereby the thermal runaway phenomenon may be further accelerated. These problems may be more serious in a bi-cell including a plurality of electrodes and an electrode assembly including the same. Typically, technologies using a PTC material are used in attempts to solve the above problems through appropriate selection of materials.

A positive temperature coefficient (PTC) material, which exhibits uniform conductivity in the general operating temperature range of a battery and the resistance of which is abruptly increased to interrupt the flow of electric current when the temperature in the battery is increased, is included in the electrode. In the case in which an additional layer made of the PTC material is formed on the electrode, the process of manufacturing the battery is complicated, with the result that the cost of manufacturing the battery is excessively increased. In addition, the force of adhesion between the PTC material layer and the electrode active material layer is low, with the result that the PTC material layer and the electrode active material layer may be separated from each other. Patent Document 2 suggests a method of manufacturing an electrode using two kinds of slurry in order to solve the above problem.

In order to interrupt the flow of electric current using the PTC material, however, it is necessary to provide a method of stably interrupting the flow of electric current through a partial intentional short circuit. A thermal runaway phenomenon occurs due to self-heating at a specific State of Charge (SoC) or higher before the PTC effect is realized. However, an obvious solution to this problem has not been suggested.

Patent Document 3, which is a patent related to a separator and was filed in the name of the applicant of the present application, discloses a separator exhibiting excellent thermal stability. In the disclosure of Patent Document 3, a porous inorganic layer is formed on the surface of a porous polymer resin, which is a base material, whereby various excellent effects, such as the thermal stability and mobile characteristics of an electrolytic solution, are obtained.

Patent Document 4 discloses a separator disposed locally in a region defined between a positive electrode sheet and a negative electrode sheet in a lithium ion capacitor, the separator having a low melting point portion, which melts at a lower temperature than other portions.

However, technology that is capable of adjusting the stable operation of the PTC material using a different material in a secondary battery has not yet been proposed.

Patent Document 1: Japanese Patent Application Publication No. 2011-210390

Patent Document 2: Korean Registered Patent No. 10-1709569

Patent Document 3: Korean Registered Patent No. 10-0775310

Patent Document 4: Japanese Patent Application Publication No. 2011-192784

Disclosure

Technical Problem

It is an object of the present invention to adjust the operation of a PTC material included in an electrode layer using a material in a secondary battery. It is another object of the present invention to provide a structure and a method for enabling an intentional short circuit in a portion of a secondary battery using an inner separator in a high-temperature situation in order to induce the operation of the PTC material, whereby the overcharged state of the secondary battery is stably terminated.

Technical Solution

In accordance with an aspect of the present invention, the above and other objects can be accomplished by the provision of a secondary battery including a positive electrode, a negative electrode, and a separator, wherein the separator includes shrinkage portions, each of which includes a porous polymer resin and which are arranged in a discontinuous manner, the shrinkage portions being configured to shrink at a high temperature, and a melting portion disposed so as to interconnect the shrinkage portions, the melting portion including a low melting point material, which melts at a high temperature, and the positive electrode or the negative electrode includes a positive temperature coefficient (PTC) material.

The shrinkage portions may be connected to the melting portion within the general temperature range within which the lithium secondary battery is operated, and the melting portion may be formed so as to have a lattice shape, by which the melting portion may surround the shrinkage portions. The shape of each of the shrinkage portions is not particularly restricted. Specifically, each of the shrinkage portions may be formed so as to have a polygonal shape, such as a triangular shape, a quadrangular shape, or a pentagonal shape, or a circular shape. The shrinkage portions may be formed so as to have the same shape or to have different shapes.

However, the shrinkage portions are characterized in that the shrinkage portions are separated from each other by the melting portion, whereby the shrinkage portions are arranged in a discontinuous manner. In addition, the shrinkage portions do not need to have the same size or to be arranged at uniform intervals or in a uniform manner. In the present invention, the portion of the separator other than the shrinkage portions may be the melting portion.

Meanwhile, a general separator having neither shrinkage portions nor a melting portion may be disposed as a component of the separator according to the present invention. This separator may be a separator including porous inorganic particles, disclosed in Patent Document 3.

It is sufficient for the melting portion to interconnect the shrinkage portions. Consequently, the area of the melting portion may be 5 to 50%, preferably 10 to 40%, more preferably 20 to 30%, of the total area of the separator. In the case in which the area of the melting portion is smaller than the above range, the melting portion may be removed early in the state in which the temperature in the secondary battery is low, whereby a short circuit may occur in the secondary battery before the temperature in the secondary battery reaches an abnormal temperature. In the case in which the area of the melting portion is larger than the above range, the area of the shrinkage portions, which are configured to shrink, becomes small, whereby a desired short-circuit area is not formed. In addition, the area of the general separator may be less than 40% of the total area of the separator. In the case in which the area of the general separator is larger than the above range, it is difficult to obtain the effect of the present invention due to overcharging of the secondary battery. The remainder of the total area of the separator is occupied by the shrinkage portions.

The separator according to the present invention may be configured such that a unit pattern is repeated or is not repeated depending on the shape of the battery. In the case in which the electrode assembly has a continuous shape, such as a jelly-roll shape, the separator according to the present invention may be configured such that the unit pattern is repeated. In the case in which the electrode assembly is configured such that unit cells are stacked, the separator according to the present invention may be configured such that the unit pattern is not repeated.

In a modification to the physical shapes of the shrinkage portions and the melting portion according to the present invention, the melting portion may be disposed in a discontinuous manner, and the shrinkage portions may be disposed in a continuous manner.

The low melting point material may have physical properties necessary for the separator of the secondary battery within the general temperature range within which the lithium secondary battery is operated, and may melt at a temperature higher than the general temperature range in which the lithium secondary battery is operated such that the shrinkage portions are separated from each other. The low melting point material according to the present invention may be at least one of PEO or polycaprolactone. The low melting point material may be 50% or more of the total weight of the melting portion.

Each of the shrinkage portions may have physical properties necessary for the separator of the secondary battery within the general temperature range within which the lithium secondary battery is operated, and may shrink at a temperature higher than the general temperature range in which the secondary battery is operated. The porous polymer resin used for each of the shrinkage portions may be a polyolefin-based polymer resin used for a general lithium secondary battery. Specifically, the porous polymer resin may be at least one selected from the group consisting of high-density polyethylene, low-density polyethylene, linear low-density polyethylene, ultrahigh-molecular-weight polyethylene, and polypropylene.

Polyolefin-based separators tend to shrink with increasing temperature. However, the shape of the separator is maintained due to the melting portion connected to the shrinkage portions even when the temperature increases. The melting portion melts at a high temperature, whereby the force of coupling between the shrinkage portions and the melting portion is reduced. When the shrinkage portions shrink as the result of shrinkage based on temperature, therefore, the positive electrode and the negative electrode come into contact with each other via the melting portion and the shrunk regions of the shrinkage portions.

The PTC material of the positive electrode or the negative electrode is a material that exhibits uniform conductivity within the general temperature range within which the lithium secondary battery is operated and is configured such that the resistance of the PTC material abruptly increases to interrupt the flow of electric current in the secondary battery when the temperature of the secondary battery becomes higher than the general temperature range within which the lithium secondary battery is operated.

The principle by which the PTC material interrupts the flow of electric current will be described below in detail. In the case in which a polymer material exhibiting low electrical conductivity is mixed with conductive particles, a low-resistance electrical channel is formed along the conductive particles. In a general state, therefore, uniform conductivity is maintained by the electrical channel formed by the conductive particles. When the temperature increases, however, the distance between the conductive particles is increased due to the expansion of the polymer material, and, depending on the circumstances, the movement of the conductive particles. As a result, the resistance of the PTC material is abruptly increased, whereby the flow of electric current is interrupted.

The polymer material is not particularly restricted, as long as the polymer material exhibits low electrical conductivity and expands to break the electrical channel or to block pores, which are channels along which ions in the electrode move, when the temperature increases. For example, the polymer material may be a thermoplastic polymer.

The thermoplastic polymer may be a semi-crystalline material. The reason for this is that it is possible to more easily acquire PTC properties from the semi-crystalline material than from an amorphous thermoplastic material. The semi-crystalline thermoplastic material may have a crystallinity of 5% or more, specifically, 10% or more, and more specifically 15% or more. The thermoplastic polymer is not particularly restricted as long as the thermoplastic polymer exhibits the above properties. For example, the thermoplastic polymer may be one or more selected from the group consisting of high-density polyethylene; linear low-density polyethylene; low-density polyethylene; medium-density polyethylene; maleic anhydride functionalized polyethylene; maleic anhydride functionalized elastomer; ethylene copolymer (e.g. Exxelor VA1801 or VA1803 manufactured by ExxonMobil); ethylene butene copolymer; ethylene octene copolymer; ethylene methyl acrylate; ethylene ethyl acrylate; ethylene acrylate copolymer such as ethylene butyl acrylate copolymer; polyethylene (PE) including glycidyl methacrylate modified polyethylene; polypropylene (PP); maleic anhydride functionalized polypropylene; glycidyl methacrylate modified polypropylene; polyvinyl chloride (PVC); polyvinyl acetate; polyvinyl acetyl; acrylic resin; syndiotactic polystyrene (sPS); polyamide including, but not limited to, PA6, PA66, PA11, PA12, PA6T, or PA9T; poly-tetra-fluoroethylene (PTFE); polybutylene terephthalate (PBT); polyphenylene sulfide (PPS); polyamide-imide; polyimide; polyethylene vinyl acetate (EVA); glycidyl methacrylate modified polyethylene vinyl acetate; polymethyl methacrylate (PMMA); polyisobutylene; polyvinylidene fluoride (PVDF), polymethyl acrylate; polyacrylonitrile; polybutadiene; polyethylene terephthalate (PET); poly-8-aminocaprylic acid; polyvinyl alcohol (PVA); and polycaprolactone.

The above specification is merely illustrative, and it is of course possible to manufacture the PTC material using thermosetting polymer in place of the thermoplastic polymer.

In accordance with another aspect of the present invention, there is provided a method of preventing overcharging of the secondary battery, the method including:

1) a step at which the melting portion melts as the result of an increase in the temperature of the secondary battery due to overcharging of the secondary battery;

2) a step at which the shrinkage portions shrink;

3) a step at which specific regions of the positive electrode and the negative electrode come into contact with each other due to deformation of the melting portion and the shrinkage portions;

4) a step at which the voltage of the secondary battery decreases due to the contact between the positive electrode and the negative electrode, whereby the state in which the secondary battery is charged is maintained and thus the temperature of the secondary battery increases; and 5) a step at which the resistance of the secondary battery abruptly increases due to melting of the PTC material, whereby the voltage of the secondary battery reaches a charging termination voltage.

The secondary battery according to the present invention may be applied to all batteries used in various manners. The secondary battery according to the present invention may be applied to all of cylindrical, prismatic, and pouch-shaped batteries. The electrode assembly may be applied to all of z-folded type, jelly-roll type, and stacked and folded type electric devices each including a positive electrode, a negative electrode, and a separator.

In accordance with a further aspect of the present invention, there is provided a battery pack including the secondary battery according to the present invention, the battery pack being configured to be prevented from overcharging, and a mobile or power device including the same.

BRIEF DESCRIPTION OF DRAWINGS

FIG. 1 is a schematic view showing an embodiment of a separator according to the present invention.

FIG. 2 is a schematic view showing the state in which the melting portion of the separator according to the present invention has melted and the shrinkage portions of the separator have shrunk as the result of a temperature increase.

FIG. 3 is a schematic view showing another embodiment of the separator according to the present invention.

FIG. 4 is a schematic view showing a thermal runaway phenomenon that occurs when a conventional battery is overcharged.

FIG. 5 is a schematic view showing a stable termination phenomenon that occurs when a battery including the separator according to the present invention is overcharged.

BEST MODE

Now, the present invention will be described in detail with reference to the accompanying drawings. It should be noted that terms or words used in this specification and the claims are not to be interpreted as having ordinary and dictionary-based meanings but as having meanings and concepts coinciding with the technical idea of the present invention based on the principle that the inventors may properly define the concepts of the terms in order to explain the invention in the best method. Consequently, the embodiments described in this specification are merely the most preferred embodiments and do not cover all technical ideas of the present invention, and therefore it should be understood that there may be various equivalents and modifications capable of substituting for the embodiments at the time of filing of the present application.

FIG. 1 is a schematic view showing an embodiment of a separator 100 according to the present invention. The separator according to the present invention includes a melting portion 110 and shrinkage portions 120. In the embodiment of FIG. 1, the shrinkage portions 120, each of which has a rectangular shape, are separated from each other, and the melting portion 110 is formed so as to have a lattice shape, by which the melting portion 110 surrounds the shrinkage portions 120.

FIG. 2 is a schematic view showing the state in which the shrinkage portions 120 of the separator 100 of FIG. 1 have shrunk as the result of a temperature increase in the state in which the melting portion 110 of the separator 100 has melted. The shrinkage rate, the short-circuit area, and the temperature of a battery may be adjusted by those skilled in the art in consideration of the operating conditions of the battery.

FIG. 3 is a schematic view showing another embodiment of the separator 200 according to the present invention. Shrinkage portions 220 may have various shapes and sizes, and may not be repeatedly arranged.

FIG. 4 is a schematic view showing a time-based thermal runaway phenomenon that occurs when a battery including a general separator, which is provided as a comparative example, is overcharged. The general separator is a single member, unlike the separator according to the present invention. That is, neither the melting portion not the shrinkage portions are separately provided. When a portion of the battery including the general separator is short-circuited at a specific time, the voltage of the battery does not increase due to the short circuit occurring at the portion of the battery even though the battery continues to be charged. However, the temperature of the battery continues to increase, and the temperature of the battery abruptly increases at another specific time, whereby the battery explodes.

In contrast, it can be seen from FIG. 5 that, when a portion of a battery including the separator according to the present invention is short-circuited, the voltage of the battery decreases and the temperature of the battery increases. At this time, the melting portion of the separator melts, whereby another portion of the battery is further short-circuited. As the temperature of the battery increases to a predetermined temperature or higher, the voltage of the battery increases as the result of the operation of a positive temperature coefficient (PTC) material, whereby the battery is not charged any further. Consequently, a phenomenon of thermal runaway of the battery does not occur.

An example using the separator according to the present invention and a comparative example using a general polyolefin-based separator are shown below.

INDUSTRIAL APPLICABILITY

The present invention provides a secondary battery configured to be prevented from catching fire or exploding in a critical situation such as overcharging and a method of preventing the secondary battery from catching fire or exploding. Since a separator including a low melting point material is used, a short circuit in the battery occurs when the battery is abnormally heated, and the resistance of an electrode is increased when the temperature of the battery increases to a predetermined temperature or higher. As a result, a positive temperature coefficient (PTC) material is operated at a stable State of Charge (SoC). Consequently, it is possible to prevent the occurrence of a thermal runaway phenomenon of the battery.

DESCRIPTION OF REFERENCE NUMERALS 100, 200 Separators
110, 210 Melting portions
120, 220 Shrinkage portions

The invention claimed is:

1. A secondary battery comprising a positive electrode, a negative electrode, and a separator, wherein
the separator comprises shrinkage portions, each of which comprises a porous polymer resin and which are arranged in a discontinuous manner so that the shrinkage portions are not attached to each other, the shrinkage portions being configured to shrink at a high temperature, and a melting portion disposed so as to interconnect the shrinkage portions, the melting portion comprising a low melting point material, which melts at a temperature higher than a temperature range in which the lithium secondary battery is operated such that the shrinkage portions are separated from each other, and
the positive electrode and/or the negative electrode comprises a positive temperature coefficient (PTC) material,
wherein the shrinkage portions and the melting portion are interconnected on a plane within a conventional temperature range in which the lithium secondary battery is operated, and the melting portion is formed so as to have a lattice shape, by which the melting portion surrounds the shrinkage portions.

2. The secondary battery according to claim 1, wherein the low melting point material has physical properties necessary for the separator of the secondary battery within a conventional temperature range in which the lithium secondary battery is operated such that the low melting point material is stable to act as a separator.

3. The secondary battery according to claim 2, wherein the low melting point material is at least one of polyethylene oxide (PEO) or polycaprolactone.

4. The secondary battery according to claim 1, wherein the porous polymer resin is at least one selected from a group consisting of high-density polyethylene, low-density polyethylene, linear low-density polyethylene, ultrahigh-molecular-weight polyethylene, and polypropylene.

5. The secondary battery according to claim 1, wherein the PTC material exhibits uniform conductivity within a temperature range in which the lithium secondary battery is operated, and resistance of the PTC material abruptly increases to interrupt a flow of electric current in the lithium secondary battery when the temperature of the lithium secondary battery becomes higher than the temperature range in which the lithium secondary battery is operated.

6. The secondary battery according to claim 5, wherein the PTC material is manufactured by mixing a polymer material exhibiting low electrical conductivity with conductive particles.

7. A battery pack comprising the secondary battery according to claim 1.

8. The secondary battery according to claim 4, wherein each of the shrinkage portions has physical properties necessary for the separator of the secondary battery within a temperature range in which the lithium secondary battery is operated such that the low melting point material is stable to act as a separator, and shrinks at a temperature higher than the temperature range in which the lithium secondary battery is operated.

9. The secondary battery according to claim 2, wherein the low melting point material comprises polyethylene oxide (PEO).

10. The secondary battery according to claim 2, wherein the low melting point material comprises polycaprolactone.

11. The secondary battery according to claim 1, wherein the porous polymer resin comprises high-density polyethylene.

12. The secondary battery according to claim 1, wherein the porous polymer resin comprises low-density polyethylene.

13. The secondary battery according to claim 1, wherein the porous polymer resin comprises linear low-density polyethylene.

14. The secondary battery according to claim 1, wherein the porous polymer resin comprises ultrahigh-molecular-weight polyethylene.

15. The secondary battery according to claim 1, wherein the porous polymer resin comprises polypropylene.

\* \* \* \* \*